United States Patent [19]
Taniguchi et al.

[11] Patent Number: 5,253,418
[45] Date of Patent: Oct. 19, 1993

[54] METHOD OF FORMING TAPPET OF THE KIND HAVING CERAMIC SEAT PLATE

[75] Inventors: Masato Taniguchi; Masaya Ito, both of Aichi, Japan

[73] Assignee: NGK Spark Plug Co, Ltd., Nagoya, Japan

[21] Appl. No.: 830,340

[22] Filed: Jan. 31, 1992

[30] Foreign Application Priority Data

Mar. 18, 1991 [JP] Japan .................. 3-080714

[51] Int. Cl.⁵ ............................................. B23P 15/00
[52] U.S. Cl. ........................ 29/888.43; 29/888.2
[58] Field of Search ................... 29/888.43, 888.2; 123/90.51, 90.49, 90.48; 74/569

[56] References Cited

U.S. PATENT DOCUMENTS

| | | | |
|---|---|---|---|
| 1,551,631 | 9/1925 | Bartlett et al. | 29/888.43 |
| 2,817,144 | 12/1957 | Zeller | 123/90.51 |
| 3,200,801 | 8/1965 | Dornbos | 123/90.51 |
| 4,317,433 | 3/1982 | Fuhrmann | 29/888.43 |
| 4,366,785 | 1/1983 | Goloff et al. | 123/90.51 |
| 4,508,067 | 4/1985 | Fuhrmann | 123/90.51 |
| 4,538,562 | 9/1985 | Matsui et al. | 123/90.51 |
| 4,993,150 | 2/1991 | Reinhardt et al. | 29/888.43 |
| 5,001,019 | 3/1991 | Ito et al. | 123/90.51 |
| 5,060,607 | 10/1991 | Taniguchi | 123/90.51 |

Primary Examiner—Irene Cuda
Attorney, Agent, or Firm—Foley & Lardner

[57] ABSTRACT

A tappet for an internal combustion engine consists of a tappet main body and a ceramic seat plate brazed to the tappet main body. The tappet main body is made up of a first part made of low carbon steel and a second part made of metal. In manufacture, the first and second parts are first welded together to constitute the tappet main body, and then the ceramic seat is brazed to the tappet main body. The low carbon steel forming the first part of the tappet main body has such a property that when carburized it can be hardened by making use of the heat for the brazing, and the metal forming the second part of the tappet main body has such a property that it can be hardened by making use of the heat for the brazing.

14 Claims, 2 Drawing Sheets

METHOD OF FORMING TAPPET OF THE KIND HAVING CERAMIC SEAT PLATE

BACKGROUND OF THE INVENTION

1. Field of the Invention

The present invention relates in general to a tappet for use between a push rod and a cam in an internal combustion engine and more particularly to a method of forming a tappet of the kind having a ceramic seat plate for contact with a cam.

2. Description of the Prior Art

With a view to improving the wear resistance of a tappet and thereby meeting the demand for a higher output of an engine, there has been proposed a tappet consisting of a tappet main body made of a single metallic material and a ceramic disk or seat plate brazed to an end of the tappet main body. The tappet main body is made of such steel that can be transformed to martensite by air cooling, such as SNCM 630 (nickel-chromium-molybdenum steel according to Japanese Industrial Standards) and SKC 24 (hollow drill steel according to Japanese Industrial Standards), so that it can be hardened by making use of the heat for brazing.

By the combination of metal and ceramics, the prior art tappet aims at attaining an improved durability with a reduced cost, i.e., aims at improving the durability by utilizing an excellent wear resistance of ceramics while lowering the cost by utilizing the low machining cost and low material cost of the metal.

However, the metal employed for the prior art tappet needs to have such a property that it can be easily brazed to the ceramic seat plate and be hardened by making use of the heat for brazing, and is therefore limited to an expensive steel such as SNCM 630, etc. Such a steel however is poor in machinability. Thus, when the entire of the tappet main body is made of such an expensive steel, a high material cost and high machining cost inevitably result. Accordingly, the prior art tappet is disadvantageous from the cost point of view.

SUMMARY OF THE INVENTION

In accordance with the present invention, there is provided a method of producing a tappet which comprises a first step of forming a first part of a tappet main body from low carbon steel and carburizing the first part, a second step of forming a second part of the tappet main body from metal and welding the first part and the second part together to constitute the tappet main body, and a third step of brazing a ceramic seat plate to an end of the second part.

The low carbon steel forming the first part has such a property that when carburized it can be hardened by making use of heat for the brazing of the third step. The metal forming the second part has such a property that it can be hardened by making use of heat for the brazing of the third step.

This method is effective for overcoming the above noted disadvantages or shortcomings inherent in the prior art tappet.

It is accordingly an object of the present invention to provide a novel method of forming a tappet for an internal combustion engine, which can reduce the manufacturing cost without deteriorating the durability of the tappet.

It is a further object of the present invention to provide a novel method of the above described character which can attain an excellent durability by utilizing a comparatively cheap material.

It is a further object of the present invention to provide a novel method of the above described character which can reduce a necessary amount of metal which is comparatively expensive, poor in machinability but suited for being brazed to a ceramic plate.

DETAILED DESCRIPTION OF THE PREFERRED EMBODIMENT

Figure 1:
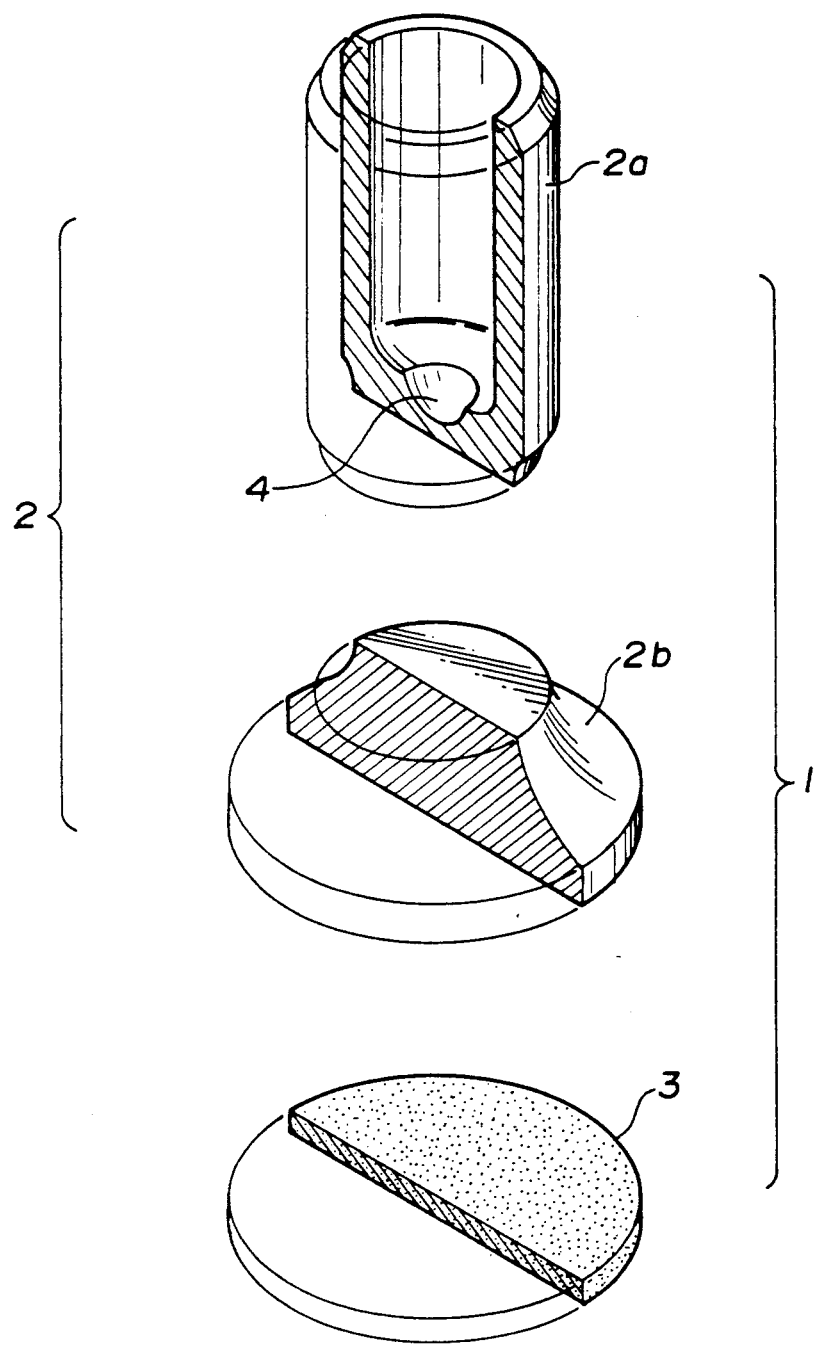
FIG. 1 is an exploded sectional view of a tappet according to an embodiment of the present invention.
Figure 2:
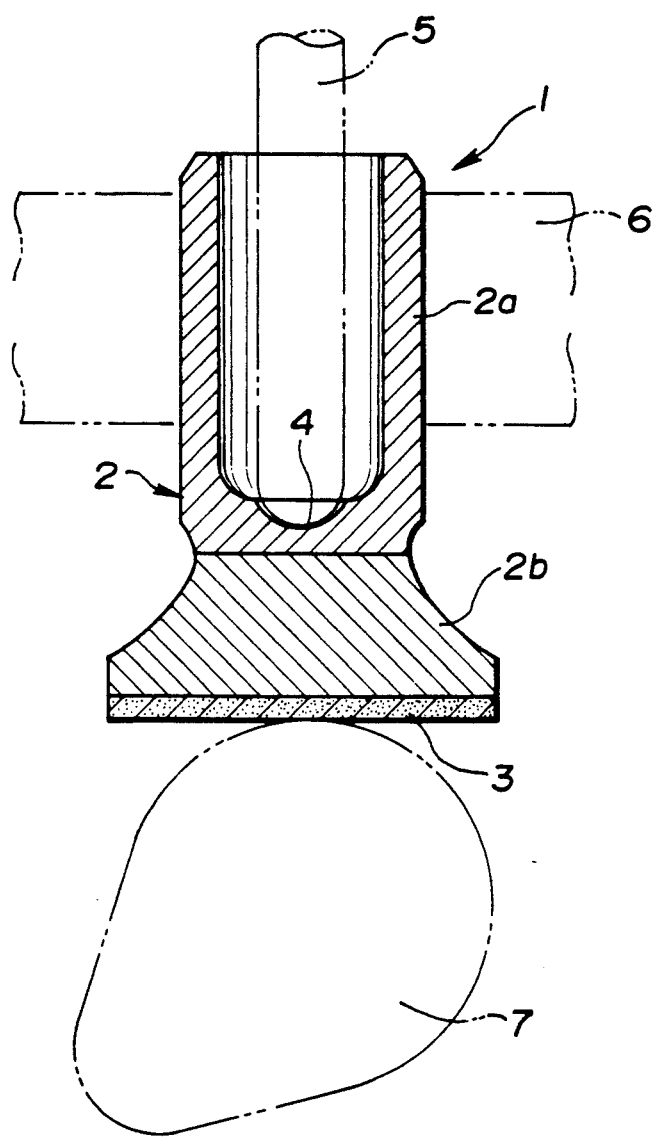
FIG. 2 is a sectional view of the tappet of FIG. 1.

Referring to FIGS. 1 and 2, a completed or finished tappet 1 consists of a tappet main body 2 made of metal and and a ceramic seat plate 3 brazed to a lower end of the tappet main body 2. The tappet main body 2 is made up of an upper part 2a and a lower part 2b which are welded together to constitute an integral unit.

The upper part 2a is generally hollow cylindrical and has a bottomed end portion having at an inner side a semispherical recess 4 for contact with a push rod 5. The upper part 2a is formed from low carbon steel which is comparatively cheap and has a good forgeability, such as SNC 815 (nickel-chromium steel according to Japanese Industrial Standards), SNCM 616 (nickel-chromium-molybdenum steel according to Japanese Industrial Standards), SNCM 420 (nickel-chromium-molybdenum steel according to Japanese Industrial Standards), etc. In the meantime, the steel can be other than the above described kinds so long as it has a good machinability before carburizing and, when carburized, it can be hardened by low-speed cooling such as air cooling. The upper part 2a is for installation in a hole of a cylinder block 6 of an internal combustion engine for up-and-down movement therein.

On the other hand, the lower part 2b is formed from steel such as SNCM 630, SKC 24, etc. In the meantime, the steel forming the lower part 2b can be other than the above described kinds so long as it has a property of being easily brazed to the ceramic plate 3 and being hardened by making use of the heat for brazing.

The above described ceramic plate 3 is for example a circular plate formed from a silicon nitride material which is sintered at atmospheric pressure and contains 90 wt % of $Si_3N_4$. The ceramic plate 3 is thick enough to endure an impact applied thereto from a cam 7 which drives a valve (not shown) by way of the tappet 1 and the push rod 5.

The method of producing the tappet 1 will now be described. The upper part 2a, lower part 2b and ceramic plate 3 are prepared so as to be independent or separated constituent parts prior to assembly.

In the first step, the low carbon steel forming the upper part 2a is carburized. The carburizing may be gas carburizing, solid carburizing, liquid carburizing, etc. While a desired carburized depth differs according to the size of the tappet 1, the material from which the upper part 2a is formed and the degree of severeness with which the tappet 1 is used, it was revealed by the test samples which will be described hereinlater that in the case of the tappet 1 sized to be 50 mm long and 20 to 30 mm in outer diameter and made of SNC 815, SNCM 616, SNCM 420, etc. a sufficient effect was attained when the carburized depth was 0.6 mm.

In the second step, the upper part 2a and the tappet main body 2. For ease of welding the carburized layer at the lower end of the upper part 2a is removed by cutting prior to the welding. The welding may be any welding such as electron beam welding, laser beam welding, friction welding, etc.

In the last third step, the ceramic plate 3 is brazed to the lower end or bottom surface of the tappet main body 2, i.e., the lower end of the lower part 2b. The brazing is performed by preferably employing a silver brazing material containing Ti (titanium). A desired brazing metal is an Ag-Cu-Ti alloy, Ag-Cu-In-Ti alloy, Ag-Ti alloy, Cu-Ti alloy or Ag-Cu-Ni-Ti alloy. The brazing surface of the ceramic plate 3, i.e., the surface of the ceramic plate 3 to be brazed to the tappet main body 2, may be metallized by vapor deposition prior to the brazing. When the brazing surface is metallized, a desired brazing metal is an Ag-Cu alloy or Ag-Cu-In alloy.

A brazing atmosphere is desired to be a nonoxide atmosphere such as an atmosphere of vacuum, Ar, $H_2$ or $N_2$. Particularly, in the case where the brazing metal contains Ti, atmosphere of vacuum or Ar is desired. A brazing temperature is set so as to be causative of hardening the carburized upper part 2a and the lower part 2b.

Then, three test samples (a), (b) and (c) and one comparative sample which have such a cross section shown in FIG. 2, whose upper part 2a is sized to be 21 mm in maximum outer diameter and 35 mm long and whose lower part 2b is sized to be 35 mm in maximum outer diameter and 13 mm long, were produced under the following conditions and subjected to the following durability test. The test result is shown in Table 1.

Production of test samples (a), (b) and (c):

(1) Upper part 2a

The upper parts 2a for the test samples (a), (b) and (c) were cold forged from SNC 815, SNCM 616 and SNCM 420, respectively and processed by gas carburizing at 900° C. and for 2 hours so that a carburized layer of 0.6 mm in thickness was formed. In the meantime, "carburized depth" herein used means "effective depth" according to Japanese industrial Standards 0557-1965. Thereafter, the carburized layer at the welding surface to be joined with the lower part 2b is removed by cutting.

(2) Lower part 2b

The lower parts 2b were formed by cutting from a round bar of SNCM 630.

(3) Ceramic seat plate 3

The ceramic seat plates 3 were formed from a powdered material containing 90 wt % of $Si_3N_4$, sintering aides of $AL_2O_3$ and $Y_2O_3$ and into a circular plate by means of a pressing and sintered at ordinary pressure in atmosphere of $N_2$ and their opposite flat sides were processed by grinding.

(4) The upper parts 2a were welded to the respective lower parts 2b by electron beam welding in the case of the test samples (a) and (b) and by laser beam welding in the case of the test sample (c).

(5) The brazing were performed by interposing a brazing metal of Ag-Cu-In-Ti alloy between the lower part 2b of each tappet main body 2 and each ceramic seat plate 3 and holding them in a vacuum at 790° C. for 30 min. in the case of the test sample (a) and at 795° C. for 30 min. in the case of the test samples (b) and (c) and in $N_2$ gas for substitution. Thereafter, the brazed integral unit of the tappet main body 2 and the ceramic seat plate 3 was cooled in a furnace.

Production of comparative sample:

(1) Upper part

The upper part 2a was formed from a round bar of S45C by cutting, heated up to 900° C. and oil hardened.

(2) The lower part 2b and ceramic seat plate 3 were the same with those of the test samples (a) to (c).

(3) The lower part 2b and ceramic plate 3 were first brazed together under the same condition to that of the test sample (b) and thereafter the upper part 2a was joined to the lower part 2b by laser beam welding.

Durability Test:

The test samples (a), (b) and (c) and comparative sample of the tappet 1 were subjected to a durability test by being installed on a 15-liter diesel engine and setting the valve clearance to be three times of a standard value (0.4 mm) while operating the engine at 170% of rated speed (about 2,500 rpm).

By such a severe durability test, the comparative sample was broken at the welded portion 15 hours after the beginning of the test. In contrast to this, no damage was found in the test samples (a), (b) and (c) which were produced according to the method of this invention even 200 hours after the beginning of the test, and therefore it was confirmed that the test samples (a), (b) and (c) were excellent in durability.

From the foregoing, it will be understood that since an upper part and lower part are first welded together to constitute a tappet main body and thereafter a ceramic seat plate is brazed to the tappet main body, the upper part and lower part can be hardened by making use of the heat for brazing while a welding distortion at the welded portion between the upper part and lower part can be removed by making use of the heat for the brazing, thus making it possible to attain a high strength at the welded portion and therefore making it possible to attain a tappet having an improved durability.

It will be further understood that the hardening of the upper and lower parts and the removal of welding distortion from the welded portion can be attained at one common process, thus making it possible to reduce the number of processes necessitated and therefore the manufacturing cost.

It will be further understood that since the tappet main body is adapted to be made up of separate upper and lower parts, the necessary amount of expensive metal suited for welding to the ceramic seat plate can be smaller and furthermore the simply shaped lower part can be easy in machining even though it is made of metal of a poor machinability, thus making it possible to reduce both the machining cost and the material cost.

It will be further understood that by partially cutting off the carburized layer from the portion of the upper part to be welded to the lower part, the weldability between the upper part and lowerpart can be improved, thus making it possible to further increase the strength at the welded portion.

TABLE 1

| | | Material of upper part | Material of lower part | Kind of welding | Brazing condition | Hardness of upper part | Hardness of lower part | Test result |
|---|---|---|---|---|---|---|---|---|
| Test | (a) | SNC815 | SNCM 630 | Electron | 790° C. × 30 min. | Hv 390 | Hv 390 | No damage |

TABLE 1-continued

|  |  | Material of upper part | Material of lower part | Kind of welding | Brazing condition | Hardness of upper part | Hardness of lower part | Test result |
|---|---|---|---|---|---|---|---|---|
| sample of this invention | (b) | SNCM616 | SNCM 630 | Electron beam welding | 795° C. × 30 min. | Hv 400 | Hv 400 | was found after 200 hr. |
|  | (c) | SNCM420 | SNCM 630 | Laser beam welding | 795° C. × 30 min. | Hv 390 | Hv 390 | |
| Comp. sample |  | S45C hardened | SNCM 630 | Laser beam welding | 795° C. × 30 min. | Hv 500 | Hv 395 | Broken after 15 hr. |

What is claimed is:

1. A method of producing a tappet comprising:
   a first step of forming a first part of a tappet main body from low carbon steel and carburizing said first part;
   a second step of forming a second part of said tappet main body from metal and welding said first part and said second part together to constitute said tappet main body; and
   a third step of brazing a ceramic seat plate to an end of said second part;
   in which said low carbon steel forming said first part has such a property that when carburized it is hardened by making use of heat for said brazing of said third step;
   in which said metal forming said second part has such a property that it is hardened by making use of heat for said brazing of said third step.

2. The method according to claim 1, further comprising, between said first step and said second step, a step of removing by cutting a carburized layer from a portion of said first part to which said second part is to be welded.

3. The method according to claim 1, wherein said low carbon steel which constitutes said first part is selected from the group consisting of SNC 815, SNCM 616 and SNCM 420.

4. The method according to claim 1, wherein said metal which constitutes said second part is selected from SNCM 630 and SKC 24.

5. The method according to claim 1, wherein said third step of brazing further comprises employing a brazing material selected from the group consisting of one or more alloys of Ag-Cu-Ti, Ag-Cu-In-Ti, Ag-Ti, Cu-Ti and Ag-Cu-Ni-Ti.

6. The method according to claim 1, wherein the brazing surface of said ceramic plate is metallized prior to brazing.

7. The method according to claim 6, where said third step of brazing further comprises employing alloys of Ag-Cu or Ag-Cu-In.

8. A method of forming a tappet for use between a push rod and a cam of an internal combustion engine, comprising the steps of:
   forming a first part of a tappet main body from low carbon steel and carburizing the same, which first part is generally hollow cylindrical and has a bottomed end portion for contact, at an inner side thereof, with the push rod;
   forming a second part of said tappet main body from metal and welding said second part to an outer side of said bottomed end portion of said first part to constitute said tappet main body;
   preparing a ceramic seat plate for contact with the cam; and
   brazing a ceramic seat plate to an end of said second part;
   in which said low carbon steel forming said first part is selected to be of such a kind that when carburized it is hardened by making use of heat for said brazing and by air cooling;
   in which said metal forming said second part is of such a kind that it is hardened by making use of heat for said brazing and by air cooling.

9. The method according to claim 8, further comprising a step of removing by cutting a carburized layer from an outer side of said bottomed end portion of said first part prior to said welding of said second part to said first part.

10. The method according to claim 8, wherein said low carbon steel which constitutes said first part is selected from the group consisting of SNC 815, SNCM 616 and SNCM 420.

11. The method according to claim 8, wherein said metal which constitutes aid second part is selected from SNCM 630 and SKC 24.

12. The method according to claim 8, wherein said third step of brazing further comprises employing a brazing material selected from the group consisting of one or more alloys of AG-Cu-Ti, Ag-Cu-In-Ti, Ag-Ti, Cu-Ti and Ag-Cu-Ni-Ti.

13. The method according to claim 8, wherein the brazing surface of said ceramic plate is metallized prior to brazing.

14. The method according to claim 13, where said third step of brazing further comprises employing alloys of Ag-Cu or Ag-Cu-In.

* * * * *